United States Patent
Barnes, III

(10) Patent No.: US 10,421,403 B2
(45) Date of Patent: Sep. 24, 2019

(54) WIND NOISE REDUCTION APPARATUS AND METHOD

(71) Applicant: FORD GLOBAL TECHNOLOGIES, LLC, Dearborn, MI (US)

(72) Inventor: Nolen Thomas Barnes, III, Bloomfield Hills, MI (US)

(73) Assignee: Ford Global Technologie, LLC, Dearborn, MI (US)

( * ) Notice: Subject to any disclaimer, the term of this patent is extended or adjusted under 35 U.S.C. 154(b) by 58 days.

(21) Appl. No.: 15/411,430

(22) Filed: Jan. 20, 2017

(65) Prior Publication Data

US 2018/0208119 A1 Jul. 26, 2018

(51) Int. Cl.
| | | |
|---|---|---|
| *B60R 1/12* | (2006.01) | |
| *B60R 1/072* | (2006.01) | |
| *B60R 1/062* | (2006.01) | |
| *B60R 1/06* | (2006.01) | |
| *B60R 1/07* | (2006.01) | |

(52) U.S. Cl.
CPC ............... *B60R 1/12* (2013.01); *B60R 1/06* (2013.01); *B60R 1/062* (2013.01); *B60R 1/072* (2013.01); *B60R 1/07* (2013.01); *B60Y 2306/09* (2013.01)

(58) Field of Classification Search
CPC .. B60R 1/12; B60R 1/072; B60R 1/06; B60R 1/062; B60R 1/07; B60Y 2306/09
USPC ........................................................ 359/843
See application file for complete search history.

(56) References Cited

U.S. PATENT DOCUMENTS

| | | | |
|---|---|---|---|
| 4,915,485 A | 4/1990 | Ogasawara | |
| 6,340,231 B1 | 1/2002 | Polzer | |
| 6,712,413 B1 | 3/2004 | Flowerday | |
| 6,916,100 B2 * | 7/2005 | Pavao | B60Q 1/2665 359/841 |
| 7,073,914 B2 | 7/2006 | Pavao | |
| 7,530,625 B2 | 5/2009 | Gulker et al. | |
| 7,621,588 B2 | 11/2009 | Zhu et al. | |
| 7,641,275 B2 | 1/2010 | Campbell et al. | |
| 8,583,329 B2 * | 11/2013 | Breed | B60R 21/0134 180/167 |
| 2003/0026008 A1 | 2/2003 | Tanaka | |
| 2006/0274442 A1 | 12/2006 | Brouwer et al. | |
| 2009/0244744 A1 | 10/2009 | Okamoto et al. | |
| 2010/0157451 A1 | 6/2010 | Sugiyama | |

(Continued)

FOREIGN PATENT DOCUMENTS

| | | |
|---|---|---|
| JP | 2007050761 A | 3/2007 |
| JP | 2007269102 A | 10/2007 |
| JP | 2016159657 A | 9/2016 |

OTHER PUBLICATIONS

English Machine Translation of JP2007050761A.
English Machine Translation of JP2016159657A.
English Machine Translation of JP2007269102A.

*Primary Examiner* — Stephone B Allen
*Assistant Examiner* — Rahman Abdur
(74) *Attorney, Agent, or Firm* — Jason Rogers; Vichit Chea; King & Schickli, PLLC

(57) ABSTRACT

A wind noise reduction apparatus for a motor vehicle includes a mirror housing, a mirror held in the mirror housing and a control module. That control module is configured to displace the mirror housing to reduce wind noise while simultaneously displacing the mirror to maintain a constant visual field.

9 Claims, 3 Drawing Sheets

(56) References Cited

U.S. PATENT DOCUMENTS

2011/0109448 A1\* 5/2011 Browne .................. B60Q 9/00
 340/438
2012/0154940 A1 6/2012 Kawanishi et al.

\* cited by examiner

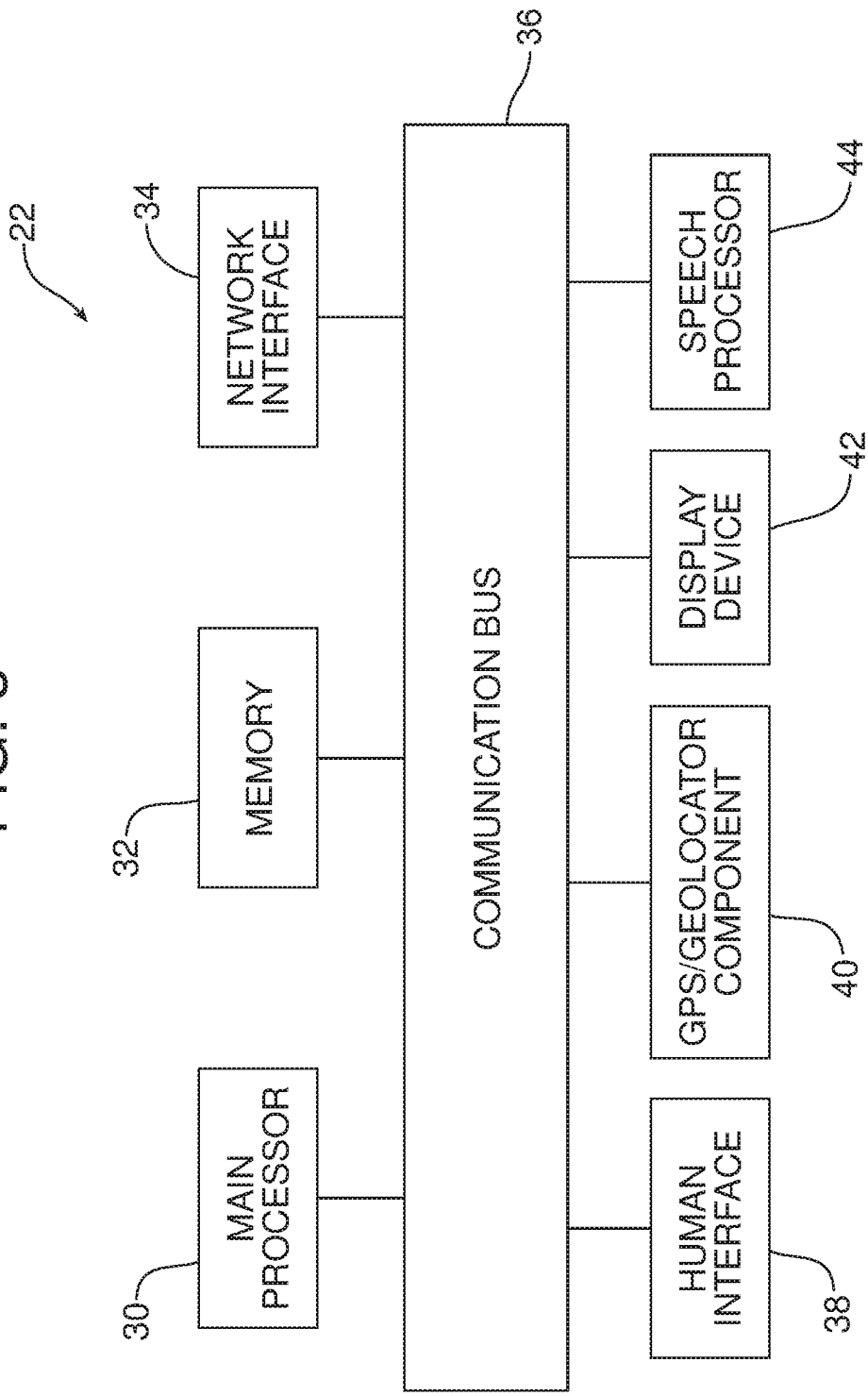

WIND NOISE REDUCTION APPARATUS AND METHOD

TECHNICAL FIELD

This document relates generally to the motor vehicle equipment field and, more particularly, to a system and method for reducing wind noise throb commonly associated with motor vehicles when one or more windows of the motor vehicle are open and the motor vehicle is traveling at roadway speeds.

BACKGROUND

When one or more windows are opened in a motor vehicle moving at roadway speeds of, for example above 65 kph, a standing wave may form in the passenger compartment of the motor vehicle. When this resonance is combined with a vortex of wind from the side mirror or a pillar adjacent the window, a booming wind noise throb may occur. This wind noise throb may be very loud (e.g. on the order of 125 dB) and at a low frequency of, for example, 50 hertz. Such a wind noise throb is unpleasant and leads to driver or passenger dissatisfaction.

In order to mitigate this problem it has been necessary in the past to either close all the windows, open other windows or alter the speed of the motor vehicle to thereby change the standing wave in the passenger compartment or change the vortex interaction with the wave. This document relates to a new and improved system and method for reducing wind noise throb to acceptable levels without having to close windows, open other windows or adjust the speed of the motor vehicle.

SUMMARY

In accordance with the purposes and benefits described herein, a wind noise reduction apparatus is provided for a motor vehicle. That wind noise reduction apparatus comprises a mirror housing, a mirror held in the mirror housing and a control module. The control module is configured to displace the mirror housing to reduce wind noise and displace the mirror to maintain a constant visual field as the mirror housing is displace in response to sound pressure in a passenger compartment of the motor vehicle exceeding a predetermined threshold level.

The control module may include a controller. The control module may also include a first actuator responsive to the controller and connected to the mirror housing whereby the mirror housing is displaced to reduce wind noise.

The control module may also include a second actuator responsive to the controller and connected to the mirror whereby the mirror is displaced in the mirror housing in order to maintain the constant visual field.

The wind noise reduction apparatus may further include a sound pressure monitoring device. That sound pressure monitoring device provides sound pressure data from the passenger compartment of the motor vehicle to a data input of the controller. The sound pressure monitoring device may include a first microphone. In some embodiments, the sound pressure monitoring device may also include a second microphone.

In accordance with an additional aspect, a method of reducing wind noise in a passenger compartment of a motor vehicle is provided. That method comprises the step of monitoring, by a sound pressure monitoring device, current sound pressure in the passenger compartment of the motor vehicle. In addition, the method includes the step of displacing, by control module, a mirror housing carried on the motor vehicle to reduce wind noise. Further, the method includes the step of displacing, by the control module, a mirror held in the mirror housing. This is done in order to maintain a constant visual field in the mirror as the mirror housing is displaced.

The method may also include the step of displacing the mirror housing only after the current sound pressure exceeds a predetermined threshold level. In addition, the method may include the step of displacing the mirror housing only after the current sound pressure exceeds a predetermined threshold level when a window of the motor vehicle is open.

The method may also include the step of sending current sound pressure data from the sound pressure monitoring device to the control module. In addition, the method may include the step of configuring a controller of the control module to displace the mirror housing to reduce wind noise and displace the mirror to maintain a constant visual field as the mirror housing is displaced in response to current sound pressure exceeding a predetermined threshold value.

In the following description, there are shown and described several preferred embodiments of the wind noise reduction apparatus and the related method of reducing wind noise in a passenger compartment of a motor vehicle. As it should be realized, the wind noise reduction apparatus and method are capable of other, different embodiments and their several details are capable of modification in various, obvious aspects all without departing from the wind noise reduction apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wind noise reduction apparatus and related method and together with the description serve to explain certain principles thereof.

FIG. 3 is a schematic block diagram of a controller that may be used in the wind noise reduction apparatus.

Reference will now be made in detail to the present preferred embodiments of the wind noise reduction apparatus and method, examples of which are illustrated in the accompanying drawing figures.

DETAILED DESCRIPTION

Figure 1:
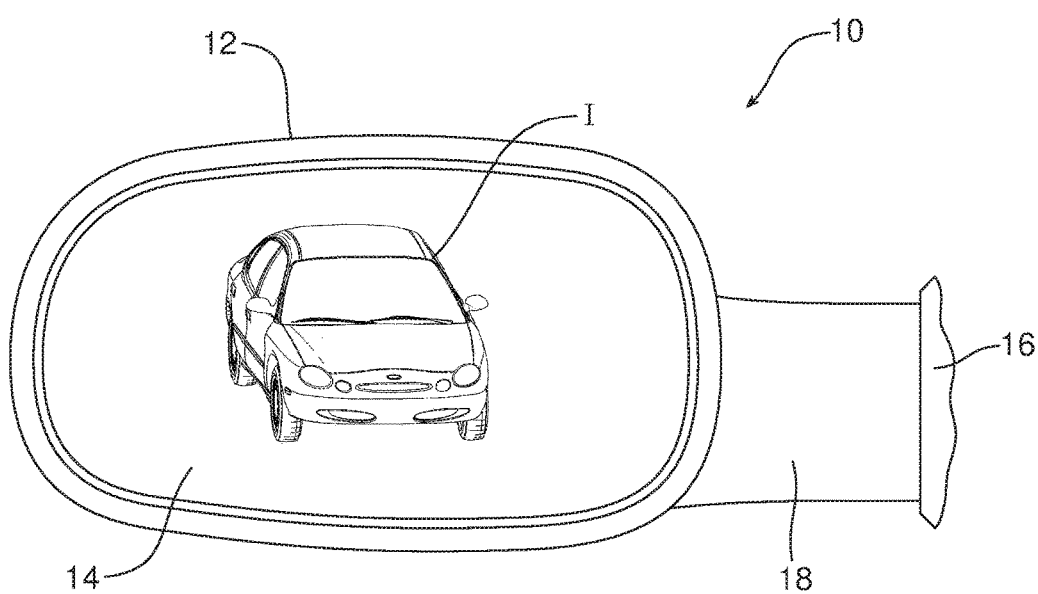
FIG. 1 is an elevational view of the mirror housing and mirror of the wind noise reduction apparatus.
Figure 2:
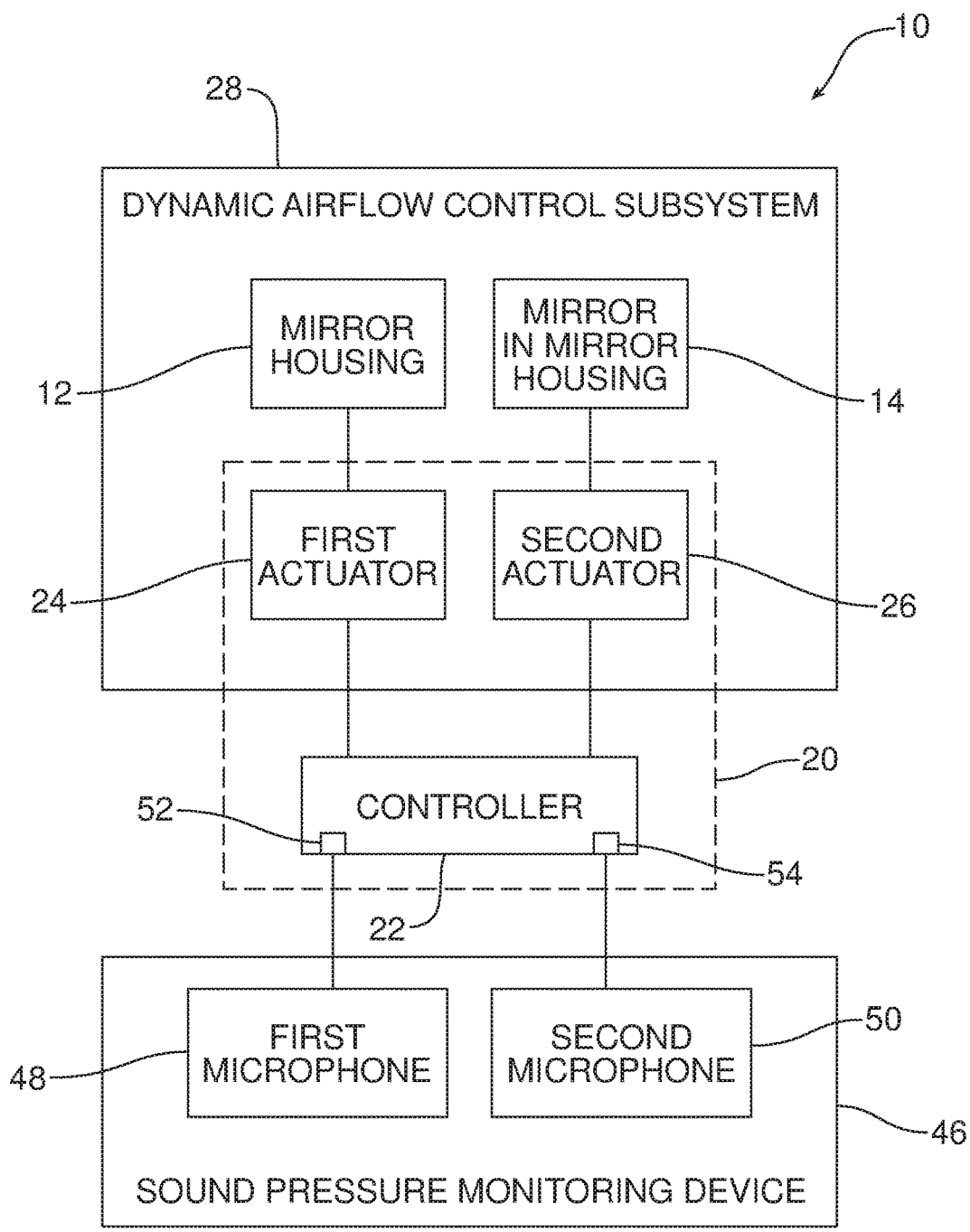
FIG. 2 is a schematic block diagram of one possible embodiment of the wind noise reduction apparatus.

Reference is now made to FIGS. 1 and 2 illustrating the wind noise reduction apparatus 10. The wind noise reduction apparatus 10 includes a mirror housing 12 and a mirror 14 held in the mirror housing. The mirror housing 12 is connected to the side 16 of the motor vehicle by means of a support arm 18. As best illustrated in FIG. 2, the wind noise reduction apparatus 10 includes a control module 20 that is configured to displace the mirror housing 12 to reduce wind noise while also displacing the mirror 14 in the mirror housing in order to maintain a constant visual field as the mirror housing is displaced in response to sound pressure in a passenger compartment of the motor vehicle exceeding a predetermined threshold level.

More specifically, as illustrated in FIG. 2, the control module 20 includes a controller 22, a first actuator 24 and a second actuator 26. The first actuator 24 is connected to the mirror housing 12 and is of a type known in the art to displace a mirror housing 12.

The second actuator 26 is connected to the mirror 14 in the mirror housing 12. The second actuator 26 is of a type known in the art to be useful in adjusting the viewing position of a mirror 14. As should be appreciated from viewing FIG. 2, the mirror housing 12, mirror 14, first actuator 24 and second actuator 26 comprise a dynamic air flow control subsystem 28 of the wind noise reduction apparatus 10.

The controller 22 may be a computing device such as a dedicated microprocessor or electronic control unit (ECU) operating in accordance with instructions from appropriate control software. Thus, as illustrated in FIG. 3, the controller 22 may comprise one or more processors 30, one or more memories 32 and one or more network interfaces 34 which communicate with each other over a communication bus 36.

In some embodiments, the controller 22 may comprise a body control module or BCM and further include a human interface 38, a GPS/Geo Locator component 40, a display device such as a multi-function display with touchscreen capability 42 and a speech processor 44 that also communicate over the communication bus 36. The BCM may perform a number of interior body electrically based functions including, for example, interior locking, remote key entry, interior lighting, exterior lighting, windshield wiper control and the like. In some embodiments the BCM may also function to control entertainment functions (e.g. radio, CD player and communications such as telephone and internet communications over a wireless network). In some embodiments the BCM is connected by a communication bus (not shown) to other control modules that provide one or more of these additional functions.

As further illustrated in FIG. 2, the wind noise reduction apparatus also includes a sound pressuring monitoring device 46. The sound pressure monitoring device 46 may be of a type known in the art for monitoring sound pressure in the passenger compartment of a motor vehicle. In the illustrated embodiment, the sound pressure monitoring device 46 includes a first microphone 48 and a second microphone 50. The two microphones 48, 50 may be placed at different positions within the passenger compartment of the motor vehicle such as, for example, in the roof liner at the front of the motor vehicle between the driver's seat and the passenger seat and in the headliner at the center rear of the motor vehicle. In the illustrated embodiment, the first microphone 48 is connected to a first data input 52 of the controller 22 while the second microphone 50 is connected to a second data input 54 of the controller 22.

The operation of the wind noise reduction apparatus 10 may be characterized as a method of reducing wind noise in a passenger compartment of a motor vehicle. That method comprises the step of monitoring, by sound pressure monitoring device 46, current sound pressure in the passenger compartment of the motor vehicle. In addition, the method includes the step of displacing, by the control module 20, the mirror housing 12 carried on the motor vehicle in order to reduce wind noise. Further, the method includes the step of displacing, also by the control module 20, a mirror held in the mirror housing in order to maintain a constant visual field in the mirror as the mirror housing is displaced. In the embodiment illustrated in FIG. 1, the visual field includes the image I of an automobile. Here it should be appreciated that the movement of the mirror 14 by the second actuator 26 counters the movement of the mirror housing 12 by the first actuator 24 so that the visual field remains constant and the image I is constantly visually presented to the driver of the motor vehicle even as the mirror housing is displaced to reduce wind noise.

In accordance with some embodiments, the method includes the step of displacing the mirror housing 12 only after the current sound pressure, as detected by the sound pressure monitoring device 46 and indicated by data sent to the controller 22 at the data the inputs 52, 54, exceeds a predetermined threshold level. That predetermined threshold level is indicative of wind noise, wind noise throb and/or wind buffeting experienced through an open window in the passenger cabin of the motor vehicle exceeding desired levels.

In alternative embodiments, the method may include the step of displacing the mirror housing only after the current sound pressure exceeds the predetermined threshold level when a window of the motor vehicle is open. Such data may be provided to the controller through a window position status monitoring device of a type known in the art at a data input for that purpose. Further, the method may include continuously monitoring the current sound pressure by means of the sound pressure monitoring device and displacing both the mirror housing 12 to reduce wind noise throb and the mirror 14 to maintain a constant visual field so long as the window is open. Thus, the dynamic air flow control subsystem 28 constantly adjusts to operating conditions to limit buffeting and reduce wind noise at all times.

The method may also include the step of sending current sound pressure data from the sound pressure monitoring device 46 to the control module 20 and, more particularly, the controller 22. Thus, it should also be appreciated that the method may include the step of configuring the controller 22 of the control module 20 to displace the mirror housing 12 to reduce wind noise and displace the mirror 14 to maintain the desired constant visual field as the mirror housing is displaced in response to current sound pressure exceeding a predetermined threshold value.

In summary, the new and improved wind noise reduction apparatus 10 and related method provide a simple and effective method for reducing wind noise associated with the way wind streams over a mirror housing 12, a support arm 18, the shape of the motor vehicle and across a window opening of an adjacent open window. The control module 20 and more particularly the controller 22 respond continuously to current sound pressure data provided by the sound pressure monitoring device 46 and effectively adjust the mirror housing 12 to reduce wind noise while simultaneously adjusting the position of the mirror 14 to maintain a constant field of view for the driver of the vehicle.

The foregoing has been presented for purposes of illustration and description. It is not intended to be exhaustive or to limit the embodiments to the precise form disclosed. Obvious modifications and variations are possible in light of the above teachings. For example, in the illustrated embodiment the wind noise reduction apparatus includes a control module 20 with a single controller 22. It should be appreciated that the controller 22 could also comprise two separate controllers, one for the first actuator 24 and one for the second actuator 26. All such modifications and variations are within the scope of the appended claims when interpreted in accordance with the breadth to which they are fairly, legally and equitably entitled.

What is claimed:

1. A wind noise reduction apparatus for a motor vehicle, comprising:
   a mirror housing;
   a mirror held in said mirror housing;
   a control module including a controller, said control module configured to displace said mirror housing to reduce wind noise and displace said mirror to maintain a constant visual field as said mirror housing is displaced in response to sound pressure in a passenger compartment of said motor vehicle exceeding a predetermined threshold level indicative of at least one of wind noise, wind noise throb and wind buffeting experience through an open window; and
   a sound pressure monitoring device providing sound pressure data from said passenger compartment to a data input of said controller.

2. The wind noise reduction apparatus of claim 1, wherein said control module includes a first actuator responsive to said controller and connected to said mirror housing is displaced to reduce wind noise.

3. The wind noise reduction apparatus of claim 2, wherein said control module also includes a second actuator responsive to said controller and connected to said mirror whereby said mirror is displaced within said mirror housing to maintain said constant visual field.

4. The wind noise reduction apparatus of claim 3, wherein said sound pressure monitoring device includes a first microphone.

5. The wind noise reduction apparatus of claim 4, wherein said sound pressure monitoring device includes a second microphone.

6. A method of reducing wind noise in a passenger compartment of a motor vehicle, comprising:
   monitoring, by sound pressure monitoring device, current sound pressure in said passenger compartment of said motor vehicle;
   displacing, by control module, a mirror housing carried on said motor vehicle to reduce wind noise; and
   displacing, by said control module, a mirror held in said mirror housing in order to maintain a constant visual field in said mirror as said mirror housing is displaced; and
   configuring a controller of said control module to displace said mirror house to reduce wind noise and displace said mirror to maintain the constant visual field as said mirror housing is displaced in response to current sound pressure exceeding a predetermined threshold value indicative of at least one of wind noise, wind noise throb and wind buffeting experienced through an open window.

7. The method of claim 6, further including displacing said mirror housing only after said current sound pressure exceeds a predetermined threshold level.

8. The method of claim 6, further including displacing said mirror housing only after said sound pressure exceeds a predetermined threshold level when a window of said motor vehicle is open.

9. The method of claim 8, including sending current sound pressure data from said sound pressure monitoring device to said control module.

* * * * *

UNITED STATES PATENT AND TRADEMARK OFFICE
CERTIFICATE OF CORRECTION

PATENT NO. : 10,421,403 B2
APPLICATION NO. : 15/411430
DATED : September 24, 2019
INVENTOR(S) : Nolen Thomas Barnes, III Page 1 of 1

It is certified that error appears in the above-identified patent and that said Letters Patent is hereby corrected as shown below:

In the Claims

Column 5, Line 19, please replace "module includes" with --module also includes--, and Column 5, Line 20, please replace "mirror housing is" with --mirror housing whereby said mirror housing is--.

Signed and Sealed this
Tenth Day of December, 2019

Andrei Iancu
*Director of the United States Patent and Trademark Office*